Patented Aug. 12, 1952

2,606,918

UNITED STATES PATENT OFFICE 2,606,918

PREPARATION OF ALDONIC ACIDS

Horace S. Isbell, Washington, D. C., assignor to the United States of America as represented by the Secretary of Commerce No Drawing. Application April 25, 1951, Serial No. 222,923

6 Claims. (Cl. 260—465.6)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of March 3, 1883, as amended (45 Stat. 467; 35 U. S. C. 45).

This invention relates to a process for the preparation of radioactive aldonic acids by condensation of aldoses with radioactive alkali cyanides and saponification of the resulting cyanhydrins. The purpose of the invention is to make the method more efficient, and to provide a means for directing the cyanhydrin reaction to the desired products.

Prior methods have used for condensation with aldoses, mixtures of HCN and ammonia, mixtures of sodium cyanide and calcium or barium chloride, and mixtures of sodium cyanide and ammonium chloride. None of the procedures has resulted in high yields of certain aldonic acids. A recent publication describing the preparation of D-glucose 1-$C^{14}$ reports radiochemical yields of only 10 percent, even though large quantities of carriers were used, to pick up all of the radioactive product. (J. A. C. S. 72, 3383 (1950).) Referring to the cyanhydrin synthesis in a publication entitled "The Synthesis of D-Glucose 1-$C^{14}$" (A. E. C. D-2400) Mahler states: "Several disadvantages are inherent in the method. It is, of course, an a-symmetrical synthesis, and the separation of the two isomers anywhere along the line is usually difficult and attended by considerable loss in yield (6-b, c). The condensation itself is not designed to give high yields—thirty percent or so being the optimum yield so far obtained in previous applications of the synthesis" (page 6).

In accordance with the present invention, these undesirable results are overcome by a process wherein condensation of the aldose with $C^{14}$-labelled cyanide is effected in the presence of a sodium carbonate-sodium bicarbonate buffer. As a result, a nearly quantitative condensation of the aldose and the cyanide is obtained and in addition, the proportions of the epimeric cyanhydrins formed can be controlled within limits so as to direct the reaction to the desired epimer.

The procedure does not involve the addition of nonvolatile anions as in the case of the calcium chloride method; for this reason, the product is more readily isolated. The alkali carbonate employed as a buffer in the condensation serves as base in the subsequent hydrolysis. The process is particularly useful for syntheses involving $C^{14}$-labelled cyanide because the labelled cyanide, as prepared, is mixed with excess sodium hydroxide. The hydroxide is readily converted to a suitable carbonate-bicarbonate mixture by the addition of bicarbonate and carbon dioxide.

In the practice of the invention, satisfactory results have been obtained with aldopentoses, aldohexoses, aldoheptoses, and reducing disaccharides, with alkali cyanides either radioactive or not such as sodium and potassium and with sarbonate buffers of the alkali metals.

The following examples are given by way of illustration only; the conditions are susceptible to change within relatively wide limits and the invention may be further modified and embodied within the scope of the subjoined claims.

EXAMPLES

1. *Preparation of mannonic lactone from L-arabinose*

Twenty ml. of 0.2 molar aqueous L-arabinose, 20 ml. of 0.2 molar $C^{14}$-labelled sodium cyanide and 4 ml. of molar sodium bicarbonate solution are mixed and allowed to stand for 18 hours at room temperature. The solution is evaporated at 60° C. to effect saponification of the nitriles and removal of ammonia. It is then passed over a column containing 20 ml. of cation-removing resin (Amberlite IR100). The column is washed with water and the solution and wash liquor are evaporated under reduced pressure to a sirup from which about 0.48 g. of crystalline mannonic lactone separates. This corresponds to a 67-percent yield. The residue contains gluconic acid, which can be readily separated as lead gluconate. The procedure is particularly useful for the production of $C^{14}$-labelled mannonic lactone but can be used for preparation of other isotopic modifications.

2. *Preparation of D-galactose from D-lyxose*

A 0.45 g. sample of D-lyxose is added to a mixture prepared from 15.3 ml. of 0.2 N $C^{14}$-labelled sodium cyanide and 6.2 ml. of 0.5 N sodium bicarbonate. The mixture is allowed to stand in a closed system for 72 hours—it is then heated to 60° C. for 6 hours and evaporated in a current of air to saponify the nitriles and remove the ammonia formed. Oxalic acid is added in sufficient amount to convert all sodium salts to oxalate, and the solution is evaporated to dryness. Complete lactonization of the aldohexonic acids is effected by the addition of methyl cellosolve and evaporation to dryness. The procedure is repeated twice. The resulting crystalline galactonic lactone can be separated from the residue, or the mixture can be used directly for the preparation of radioactive D-galactose by the procedure described in my co-pending application, Serial No. 222,925, filed April 25, 1951.

3. Addition of sodium cyanide to 3-galactosylarabinose

A 0.94 g. sample of 3-galactosylarabinose is added to a mixture prepared from 15.3 ml. of 0.2 N $C^{14}$-labelled sodium cyanide and 6.2 ml. of 0.5 M sodium carbonate. The mixture is allowed to stand at room temperature for 48 hours; it is then heated to 80° C. in a current of air for 3 hours to effect saponification of the nitriles and elimination of the ammonia formed. The resulting salts are converted to the free acids by passing the solution over an ion exchange resin (Amberlite IR100). The solution and wash liquor are evaporated under reduced pressure to a volume of about 5 ml. The solution is transferred to a beaker by use of 15 ml. of methyl cellosolve, and the solvent is evaporated over $CaCl_2$ in a desiccator at room temperature. When the solution becomes thick, it is seeded with lactobionic lactone, and crystallization is allowed to take place, with the addition from time to time of a few drops of methyl cellosolve. In the course of time, substantially all of the radioactive lactobionic acid is converted to crystalline lactone. The lactone can be readily separated from the liquid impurities, or it can be used without purification for production of radioactive lactose.

4. Alteration of the proportions of the epimeric acids formed from aldoses by use of sodium bicarbonate and sodium carbonate buffers The accompanying table gives the results from two sets of cyanhydrin reactions. One set involved the condensation of 3 millimoles of aldose with 3.3 millimoles of sodium cyanide in the presence of 3.0 millimoles of sodium carbonate; the other set involved condensation of 3 millimoles of aldose with 3.3 millimoles of sodium cyanide in the presence of 3.0 millimoles of sodium bicarbonate saturated with $CO_2$. The table gives the specific rotation of the mixed amides prepared from the product, and the estimated composition of the product. The proportions of the epimeric acids formed were calculated from the rotation of the amide mixture and the known rotations of the epimeric amides.

5. Preparation of barium gluconate from D-arabinose

Twenty ml. of 0.2 molar aqueous D-arabinose, 20 ml. of 0.2 molar $C^{14}$-labelled sodium cyanide and 2 ml. of molar sodium carbonate solution are mixed and allowed to stand for 18 hours at room temperature. The solution is evaporated at 60° C. to effect saponification of the nitriles and removal of ammonia. It is then passed over a column containing 20 ml. of cation-removing resin (Amberlite IR100). The column is washed with water, and the solution and lash liquor are combined and neutralized with barium hydroxide. The solution is concentrated to a sirup from which barium gluconate crystallizes in about 60 percent yield.

It it will be apparent that the embodiments shown are only exemplary and that various modifications can be made within the scope of my invention as defined in the appended claims.

I claim:

1. The process for producing aldonic acids which consists in condensing an aldose with an alkali metal cyanide in the presence of an alkali carbonate-bicarbonate buffer, saponifying the nitrile, and separating the epimeric aldonic acids in known manner.

2. The invention according to claim 1, wherein the alkali metal carbonate-bicarbonate buffer is adjusted to favor the production of a desired epimer.

3. The process for producing gulconic and mannonic acids which consists in condensing arabinose with sodium cyanide in the presence of a sodium carbonate-bicarbonate buffer adjusted to favor the production of the desired epimer, saponifying the nitrile and separating the resulting gluconic and mannonic acids in known manner.

4. The process for producing radioactive D-gluconic acid which consists in condensing D-arabinose with carbon-14-labelled sodium cyanide in the presence of sodium carbonate, saponifying the resulting nitrile and separating the resulting gluconic acid in the form of crystalline barium gluconate.

5. The method for altering the proportions of the epimeric cyanohydrins formed from aldoses by condensation with an alkali metal cyanide, consisting of addition to the aqueous cyanide-aldose reaction mixture of a buffer selected from the group consisting of an alkali metal bicarbonate, an alkali metal carbonate, and a mixture of alkali metal bicarbonate and alkali metal carbonate.

ADDITION OF SODIUM CYANIDE TO SUGARS

| Aldose | Apimeric Acids Formed | | Yields From | | | | | |
|---|---|---|---|---|---|---|---|---|
| | A | B | Sodium carbonate buffer | | | Sodium bicarbonate buffer | | |
| | | | $[\alpha]_D^{20}$ of amide mixture | Percent A | Percent B | $[\alpha]_D^{20}$ amide mixture | Percent A | Percent A |
| D-arabinose | D-gluconic | D-mannonic | +14.3 | 60 | 40 | −1.4 | 26 | 74 |
| D-lyxose | D-galactonic | D-talonic | +13.8 | 71 | 29 | +20.2 | 82 | 18 |
| D-xylose | D-gulonic | D-idonic | +0.6 | 72 | 28 | +2.2 | 75 | 25 |
| D-mannose | D-glycero-D-gala-aldoheptonic | D-glycero-D-talo-aldoheptonic | +13.3 | 73 | 27 | +18.0 | 82 | 18 |
| D-galactose | D-glycero-L-manno-aldoheptonic | D-glycero-L-gluco-aldoheptonic | −11.3 | 25 | 75 | +6.4 | 23 | 77 |
| D-glucose | D-glycero-D-gulo-aldoheptonic | D-glycero-D-ido-aldoheptonic | −0.3 | 73 | 27 | −0.6 | 73 | 27 |
| 3-galactosyl-arabinose | lactobionic | 4-galactosyl-mannonic | +58.2 | (1) | (1) | +34.1 | (1) | (1) |

[1] Data not available for calculating percentages, but lactobionic acid is favored by high alkalinity.

6. The method for altering the proportions of the epimeric cyanohydrins formed from aldoses by condensation with an alkali metal cyanide consisting of addition to the aqueous cyanide-aldose mixture of an alkali metal bicarbonate and carbon dioxide.

HORACE S. ISBELL.

REFERENCES CITED

The following references are of record in the file of this patent:

UNITED STATES PATENTS

| Number | Name | Date |
|---|---|---|
| 1,285,248 | La Forge | Nov. 19, 1918 |
| 1,984,415 | Macallum | Dec. 18, 1934 |
| 2,537,814 | Davis | Jan. 9, 1951 |

OTHER REFERENCES

Kiliani: Ber. Deut. Chem., vol. 19, p. 3033 (1886).

Kiliani: Ber. Deut. Chem., vol. 20, pp. 282, 339 (1887).

Fischer: Ber. Deut. Chem., vol. 23, pp. 2134, 2611, 2628 (1890).

Fischer: Ber. Deut. Chem., vol. 24, p. 529 (1891).

Fischer: Ber. Deut. Chem., vol. 28, p. 1975 (1895).

Fischer: Ber. Deut. Chem., vol. 33, pp. 2146–2147 (1900).

Fischer: Liebig's Ann., vol. 270, p. 71 (1892).